United States Patent [19]
Nosco et al.

[11] 3,779,643
[45] Dec. 18, 1973

[54] EASEL LOCKING DEVICE

[75] Inventors: Louis C. Nosco, Webster; James E. Ryan, Avon, both of N.Y.

[73] Assignee: Eastman Kodak Company, Rochester, N.Y.

[22] Filed: Oct. 26, 1972

[21] Appl. No.: 300,921

[52] U.S. Cl.................................. 355/75, 355/74
[51] Int. Cl. ............................................ G03b 27/62
[58] Field of Search........................... 355/74, 75, 76

[56] References Cited
UNITED STATES PATENTS

| | | | |
|---|---|---|---|
| 3,132,560 | 5/1964 | Rignone et al.................... | 355/76 X |
| 3,488,120 | 1/1970 | Nagel................................... | 355/75 |
| 3,677,635 | 7/1972 | Van Auken et al. ............. | 355/75 X |
| 3,682,547 | 8/1972 | Ratowsky............................. | 355/74 |

*Primary Examiner*—Samuel S. Matthews
*Assistant Examiner*—E. M. Bero
*Attorney*—W. H. J. Kline et al.

[57] ABSTRACT

A photographic copying apparatus is provided with a document holder for carrying different size documents which are to be copied. The document holder is supported on the copying apparatus for movement between a document copying position and a document loading and unloading position. An easel mechanism, mounted on the document holder, includes a plurality of easel members which cooperate to frame an area occupied by a document. At least one of the easel members is movable to vary the size of such area for accommodating different size documents. An easel locking device restrains at least one of the easel members from movement to vary the size of the area framed thereby, in response to movement of the document holder out of the document loading and unloading position, and releases at least one of the easel members for movement to vary the size of such area, in response to movement of the document holder into the document loading and unloading position.

3 Claims, 18 Drawing Figures

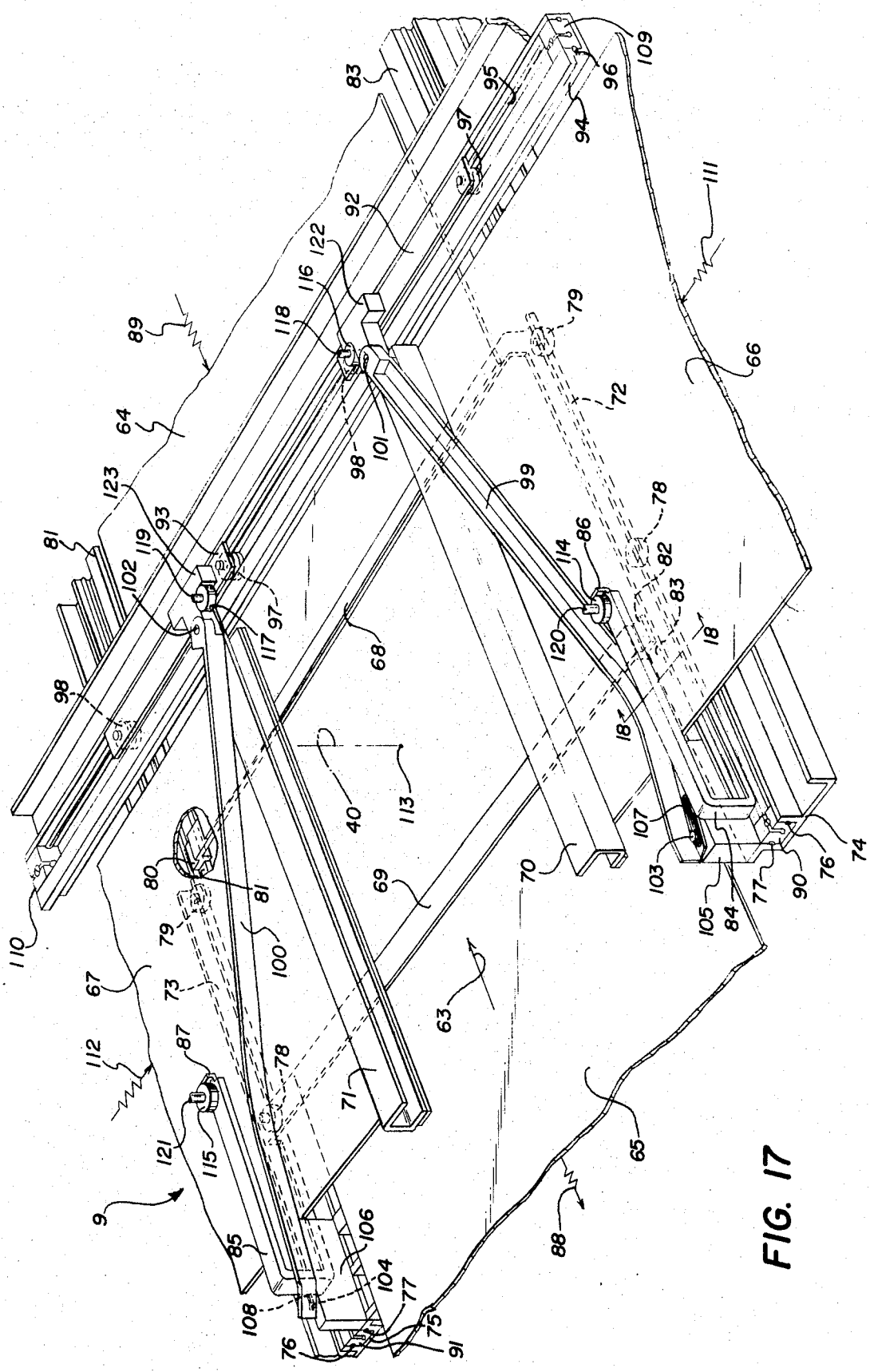

EASEL LOCKING DEVICE

BACKGROUND OF THE INVENTION

1. Field of the Invention

The present invention relates to a photographic copying apparatus wherein an easel mechanism is adjustable for framing different size documents which are to be copied. More particularly, the invention relates to a locking device for such easel mechanism.

2. Description of the Prior Art

It is known to provide a photographic copying apparatus with a document holder for carrying different size documents which are to be copied. The document holder may include an easel mechanism having a plurality of easel members which cooperate to peripherally enclose an area occupied by a document. Generally, at least one of the easel members is movable to vary the size of such area for accommodating different size documents. The easel members can be used to mask about the area occupied by a document or, merely, to firmly secure the document on the document holder. Before moving the document holder into a document copying position within the copying apparatus, the easel members are manually locked in a selected relative configuration for the purpose of restraining such members from any movement which would change the size of the area enclosed thereby. After the document is copied, the document holder is removed from within the copying apparatus and the easel members are manually unlocked to enable unloading of the document from the document holder. Although this mode of operation may appear to be satisfactory, unnecessary time is consumed in requiring an operator to manually lock and unlock the easel members.

SUMMARY OF THE INVENTION

It is therefore a general object of the present invention to provide an easel locking device which operates in an automatic manner.

It is a further object of the present invention to provide a photographic copying apparatus in which an easel locking device operates (1) to restrain at least one of several easel members from movement to vary the size of an area framed by such members, in response to movement of the easel members out of the document loading and unloading position, and (2) to release at least one of the easel members for movement to vary the size of such area, in response to movement of the easel members into the document loading and unloading position.

In accordance with the present invention there is described, in detail hereinafter, a photographic copying apparatus which is provided with a document holder for carrying different size documents. The document holder is supported on a copying apparatus for movement between a document copying position and a document loading and unloading position. An easel mechanism, mounted on the document holder, includes a plurality of easel members which cooperate to frame an area occupied by a document. At least one of the easel members is movable to vary the size of such area for accommodating different size documents. An easel locking device restrains at least one of the easel members from movement to vary the size of the area framed thereby, in response to movement of the document holder out of the document loading and unloading position, and releases at least one of the easel members for movement to vary the size of such area, in response to movement of the document holder into the document loading and unloading position. More specifically, the easel locking device includes a restraining piece which is movable between a locking position, for restraining at least one of the easel members, and an idle position, for releasing at least one of such members. The easel device further includes means for moving the restraining piece between the locking and idle positions respectively in response to movement of the easel member out of and into the document loading and unloading position.

BRIEF DESCRIPTION OF THE DRAWINGS

The above-mentioned and other features and objects of the present invention and the manner of obtaining them will become more apparent by reference to the following detailed description of a preferred embodiment of such invention taken in conjunction with the accompanying drawings, wherein:

FIG. 17 is a perspective view of an easel mechanism of the photographic copying apparatus.

DESCRIPTION OF THE PREFERRED EMBODIMENT

Figure 1:
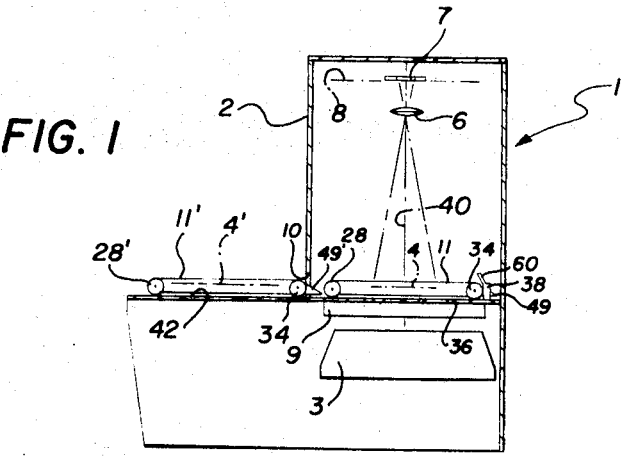
FIG. 1 is a section view of a photographic copying apparatus adapted for use with different size documents.

Referring now to the drawings and in particular to FIG.1, a preferred embodiment of the invention is illustrated as applied to a photographic projection copying apparatus 1. The copying apparatus 1 generally comprises a light-tight housing or cabinet 2 in which a light source 3 is arranged to illuminate a document 4 from below. As depicted in FIG. 1, the document 4 can be imaged, by a projection lens 6, on a light-sensitive photographic material 7 which is located in the housing 2 at an exposure plane 8. In this way, by means well known, the document 4 is to be copied on the photographic material 7. As shown in FIG. 1, a masking mechanism 9 is arranged between the light source 3 and the document 4 for masking about such document in order to regulate the quantity of light reflecting in the lens 6. However, as suggested by the prior art, the masking mechanism 9 may be arranged just below the exposure plane 8 to mask all but a discrete portion of the photographic material 7 and prevent and fogging of the remainder of such material. An access way 10, having a suitable light trap (not shown), is formed in the housing 2 for allowing movement of a document holder 11 into and from the housing.

Figure 3:
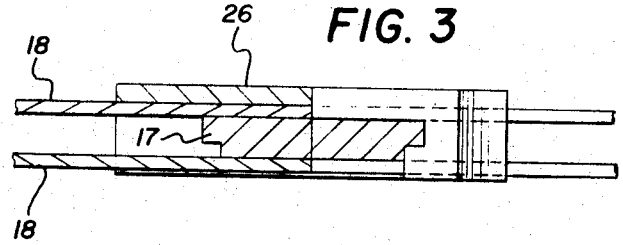
FIG. 3 is a section view as viewed along the line 3—3 in FIG. 2.
Figure 4:
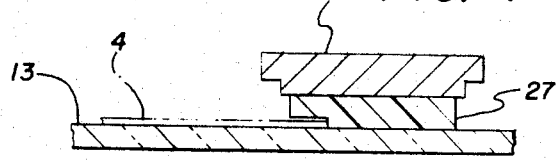
FIG. 4 is a section view as viewed along the line 4—4 in FIG. 2.
Figure 2:
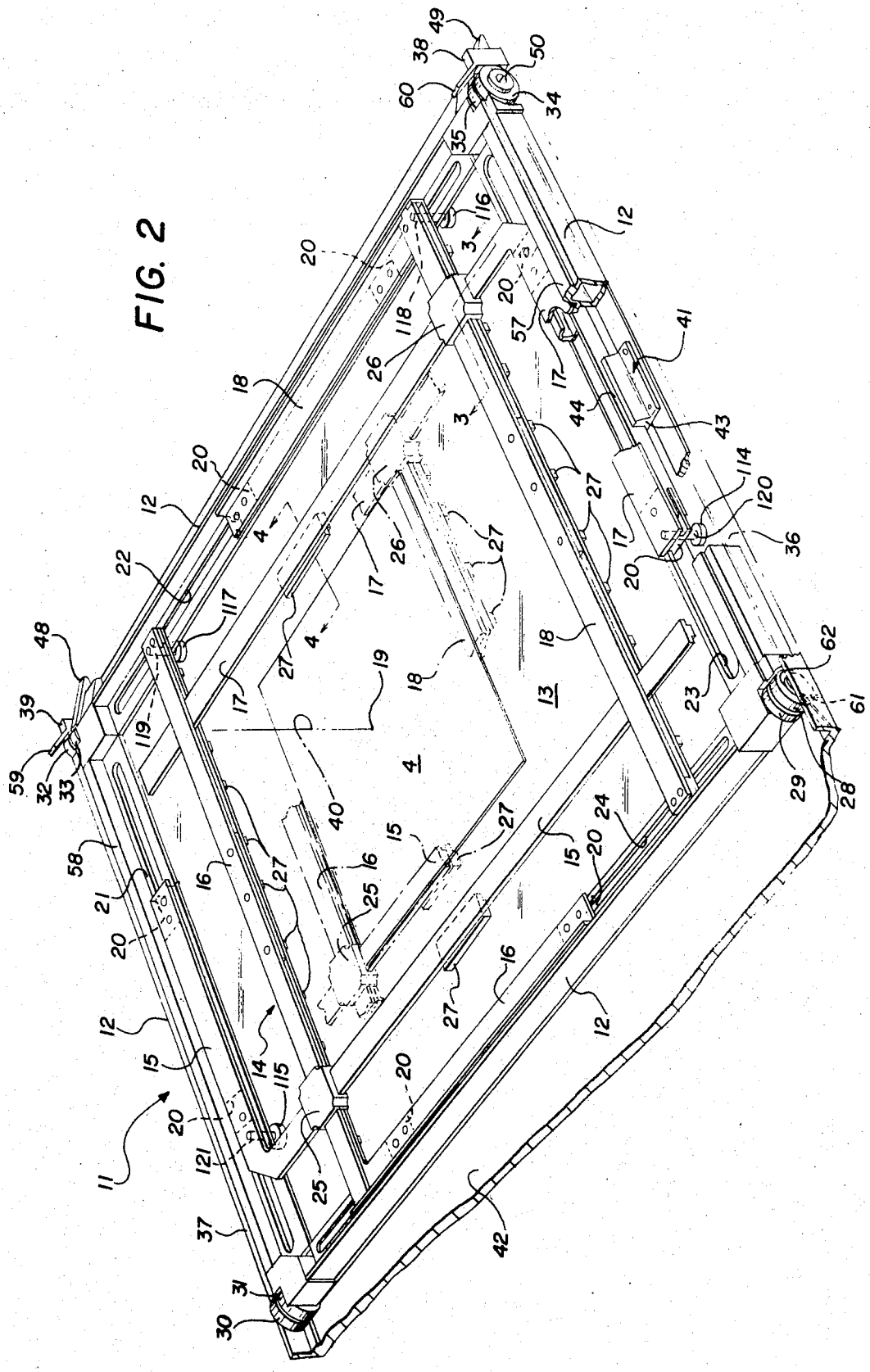
FIG. 2 is a perspective view of a document holder and easel mechanism of the photographic copying apparatus.

As shown in FIG. 2, the document holder 11 has a rigid frame 12 which encloses a substantially square area. Fixed to the holder frame 12 is a glass sheet 13 which, as viewed in FIG. 2, supports the document 4 while permitting illumination from below. An easel mechanism 14 is mounted on the holder frame 12 and includes four L-shaped easel members or bars 15, 16, 17 and 18. The easel members 15–18 cooperate to frame or peripherally enclose an area occupied by the document 4 on the glass sheet 13 and are movable over such sheet in mutually perpendicular directions to frame different size areas having a common center point 19 and respectively occupied by different size documents. This feature is schematically illustrated in FIG. 2 which shows the easel members 15–18 in solid lines framing a particular size area and in phantom lines framing a comparatively smaller size area. To effect movement of the easel members 15–18 to frame different size areas, these members have fixed to their respective undersides two spaced guide blocks 20. Each of the guide blocks 20 are retained in, and slidable along, one of four slots 21, 22, 23 and 24 defined by the holder frame 12. Thus, as shown in FIG. 2, the two guide blocks 20 on the easel member 17 are retained in, and slidable along, the slot 23. Whereas, the two guide blocks 20 on the easel member 16 are retained in, and slidable along, the slot 24. Moreover, two coupling blocks 25 and 26 are respectively located at the intersection of the easel members 15 and 16 and at the intersection of the easel members 17 and 18 to support the easel members at these intersections, in the manner shown by FIG. 3, for sliding movement of the easel members in mutually perpendicular directions. To hold the document 4 on the glass sheet 13, the easel members 15–18 have fixed to their respective undersides several lip blocks 27 which are shaped to partially overlie the document as shown in FIG. 4. These lip blocks 27 have respective undersides which rest on the glass sheet 13, but which are sufficiently smooth so as not to inhibit movement of the easel members 15–18.

FIG. 2 illustrates the document holder 11 in the same position, within the housing 2 of the copying apparatus 1, as shown in FIG. 1. It will be recognized, of course, that this position is a document copying position. Viewing FIG. 2, the document holder 11 has four pairs of outside and inside idler rollers 28 and 29, 30 and 31, 32 and 33, and 34 and 35 which are respectively located at the four corners of the holder frame 12. These rollers 28–35 are of the same size diameter and are of the same size width, and can be separately rotated. To facilitate movement of the document holder 11 into and from the housing 2, through the access way 10, the copying apparatus 1 includes, inside the housing, two parallel spaced guide tracks 36 and 37 over which the outside rollers 28, 30, 32 and 34 ride. As depicted in FIG. 2 and for reasons to become apparent hereinafter, the guide tracks 36 and 37 are sufficiently spaced apart to support the outside rollers 28, 30, 32 and 34 while avoiding contact with the inside rollers 29, 31, 33 and 35. Moreover, as can be realized from FIGS. 1 and 2, the guide tracks 36 and 37 are arranged to support the document holder 11 in a manner such that when the document holder is fully moved into the housing 2, to assume the document copying position, the outside rollers 33 and 34 will come to rest against two stop blocks 38 and 39 and the center point 19 of the area framed by the easel members 15–18 will be located on a principal axis of image projection 4.

The document holder 11 includes four locking mechanisms 41 (not all shown) which operate simultaneously to lock respective ones of the easel members 15–18 in a selected relative configuration and which, further, operate simultaneously to unlock respective ones of the easel members for movement to vary the size of the area enclosed therebetween (see FIG. 2). As will be explained hereinafter, the locking mechanisms 41 operate to lock the easel members 15–18 in response to initial movement of the document holder 11 out of a document loading and unloading position, on a table 42 of the copying apparatus 1, and into the housing 2 (see FIG. 1). Moreover, the locking mechanisms 41 operate to unlock the easel members 15–18 when the document holder 11 is returned, from within the housing 2, to the document loading and unloading position on the table 42. In the document loading and unloading position, because the easel members 15–18 are no longer locked in a particular relative configuration, an operator of the copying apparatus 1 can move the easel members for removal of the document 4 from the glass sheet 13 and for replacement of this document with another.

Figure 5:
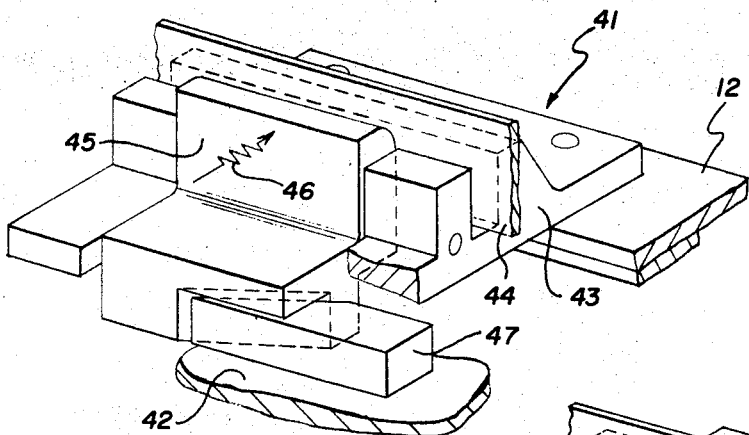
FIGS. 5 and 6 are perspective views of an easel locking mechanism on the document holder, according to a preferred embodiment of the present invention, and respectively showing the easel locking mechanism in unlocked and locked positions.
Figure 6:
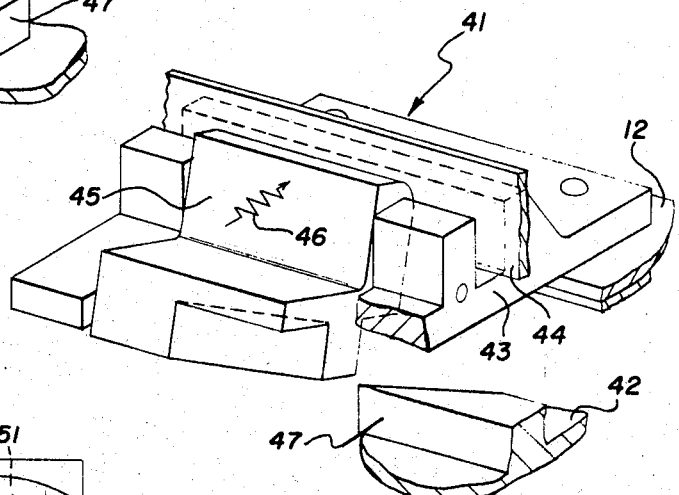

Because the locking mechanisms 41 are similar in construction and operation, the particulars of only one such mechanism will be described in detail. FIG. 5 illustrates one locking mechanism 41, in an unlocked or idle position, occurring when the document holder 11 is in the document loading and unloading position on the table 42. Whereas, FIG. 6 illustrates the same locking mechanism 41, in a locking position, occurring when the document holder 11 is initially moved out of the document loading and unloading position and into the housing 2. Specifically, as can be appreciated from viewing FIGS. 2, 5 and 6, this locking mechanism 41 includes a channel defining member 43 which is fixed to the frame 12 of the document holder 11 and loosely supports a resiliently flexible reed member 44. The opposite ends (not shown) of the reed member 44 are secured to the easel member 17 for movement therewith, with respect to the holder frame 12 (the reed members of other locking mechanisms being secured to other respective ones of the easel members 15–18). A clamp lever 45 is pivotally mounted on the channel defining member 43 for movement into and out of abutment with the reed member 44. A helical compression spring 46 is disposed to urge the clamp lever 45 firmly against the reed member 44 so as to pin such member against the channel defining member 43 and prevent movement of the easel member 17 with respect to the holder frame 12 (see FIGS. 2 and 6). As can be realized from FIG. 5, when the document holder 11 is returned to the document loading and unloading position, from within the housing 2, a wedge or cam block 47 fixed to the table 42 pivots the clamp lever 45 out of abutment with the reed member 44 to no longer resrain the easel member 17. However, as can be realized from FIG. 6, when the document holder 11 is initially moved out of the document loading and unloading position and into the housing 2, the clamp lever 45 is free to again pivot into abutment against the reed member 44 and will do so at the urging of the spring 46.

Figure 7:
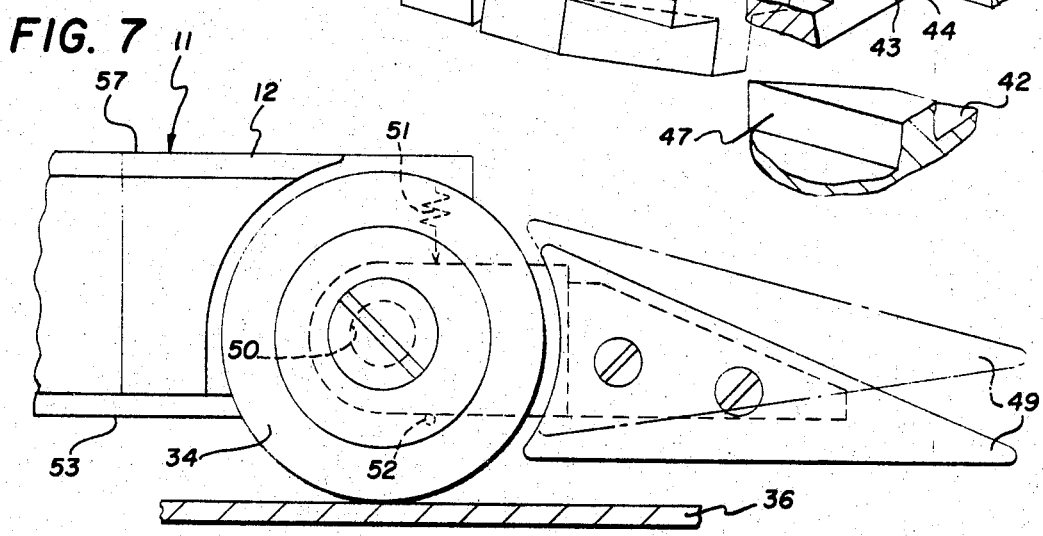
FIG. 7 is an elevation view of a forward roller and a ramp block on the document holder.

Referring again to FIG. 2, the document holder 11 is shown to include two triangular-shaped ramp or wedge blocks 48 and 49 which are located respectively forward of the two inside rollers 33 and 35 and which have the same width dimension as that of such rollers. For reasons to become apparent hereinafter, these ramp blocks 48 and 49 do not extend in front of the two outside rollers 33 and 34. The ramp blocks 48 and 49 are pivotally connected to a rotational axle 50 of the rollers 32–35 and, as viewed in FIG. 7, are individually urged by separate helical compression springs (only one of which is illustrated, as 51) to pivot about such axle in a clockwise direction. However, two lugs (only one of which is illustrated, as 52) are fixed to the holder frame 12 to limit this spring urging of the ramp blocks 48 and 49.

As may have been realized from viewing FIG. 1, use of the copying apparatus 1 involves having a second document holder 11' in the document loading and unloading position on the table 42 while the first document holder 11 is in the document copying position within the housing 2. The first and second document holders 11 and 11' are of similar design and can carry the same or different size documents 4 and 4' (see FIG. 13). As schematically illustrated in FIGS. 8–12, use of the copying apparatus 1 further involves interchanging the respective positions of the first and second document holders 11 and 11'. Such position interchanging is initiated, of course, after the document 4 on the first document holder 11 has been copied, and after the document 4' has been loaded onto the second document holder 11' and the easel members 15'–18' of the second document holder have been suitably positioned.

Figure 11:
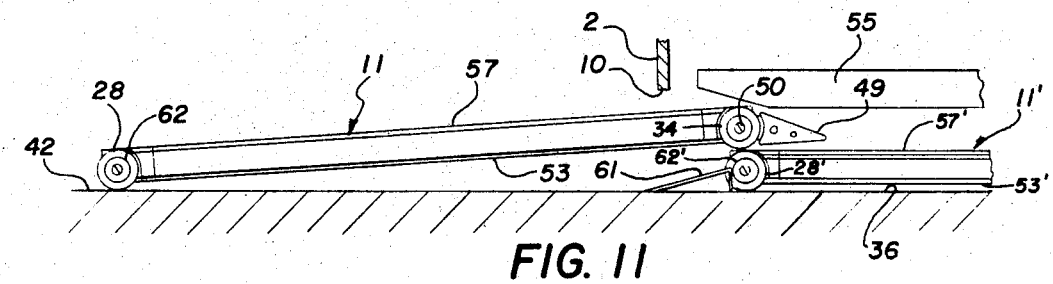
Figure 12:
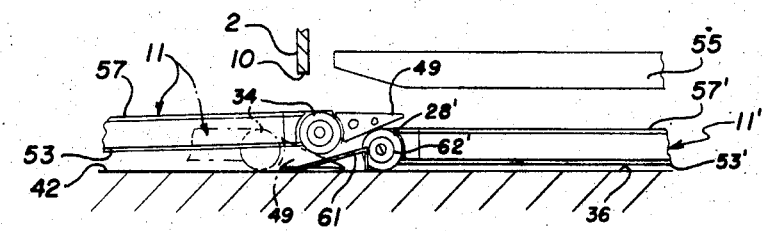
Figure 13:
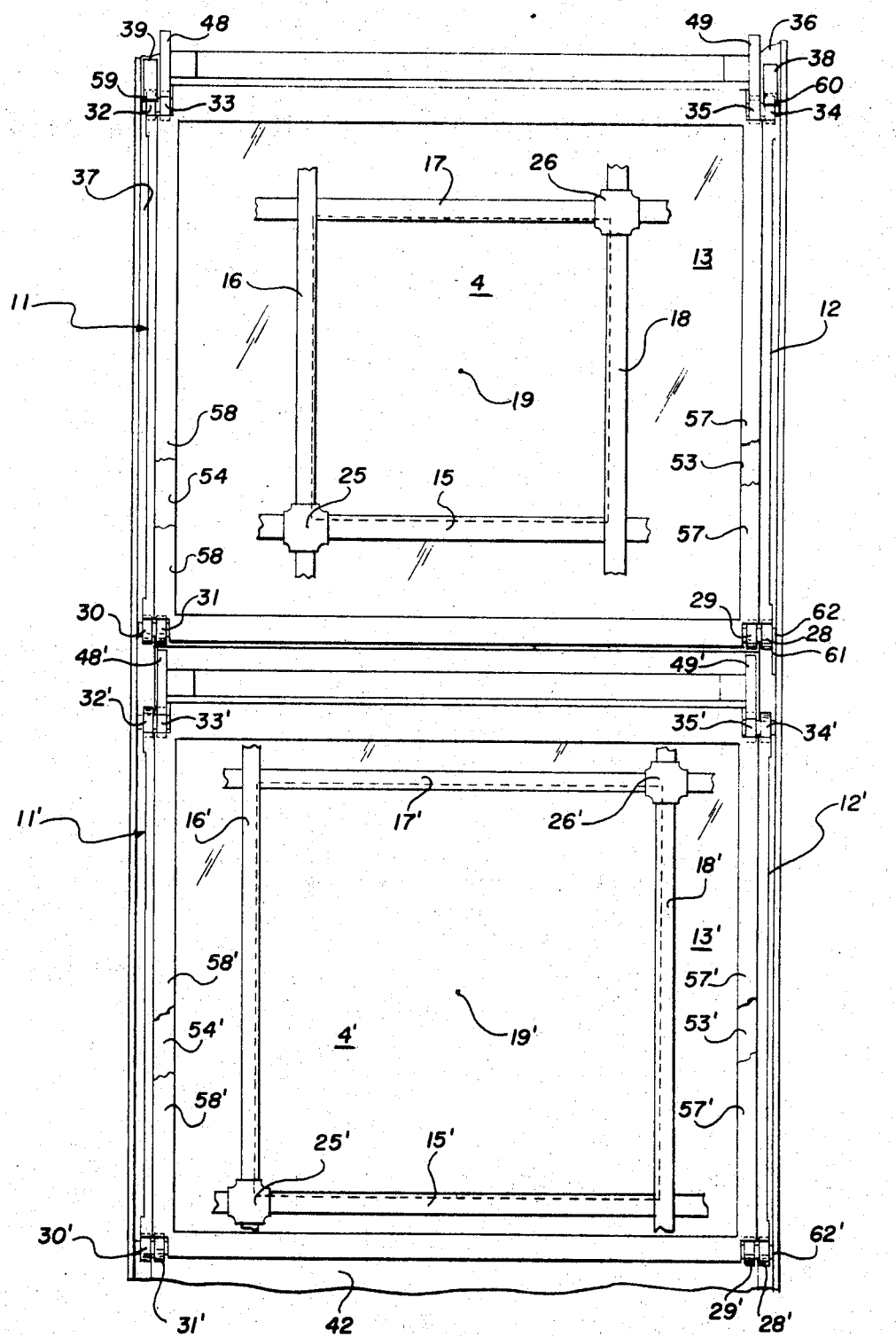
FIG. 13 is a partial plan view of the two document holders, showing an arrangement of such holders immediately before interchanging in the photographic copying apparatus.
Figure 14:
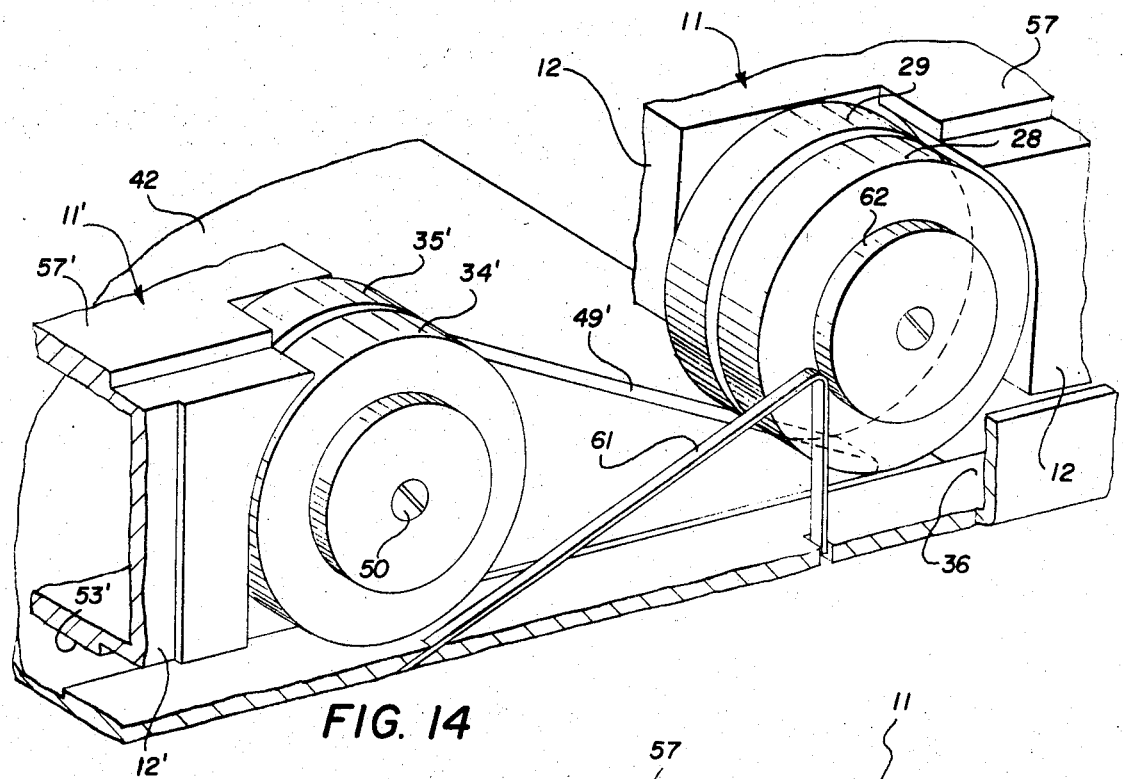
FIG. 14 is a perspective view of a detail of FIG. 8.

Before considering FIGS. 8–12, in detail, reference is made to FIG. 13 which partially shows the first and second document holders 11 and 11' in the same respective positions as shown in FIG. 1. Because the first and second document holders 11 and 11' are of similar design, the corresponding members of these holders are designated by the same reference number. However, to distinguish between the members of the first and second document holders, the reference numbers designating the members of the second document holder are provided with an apostrophe (').

Figure 15:
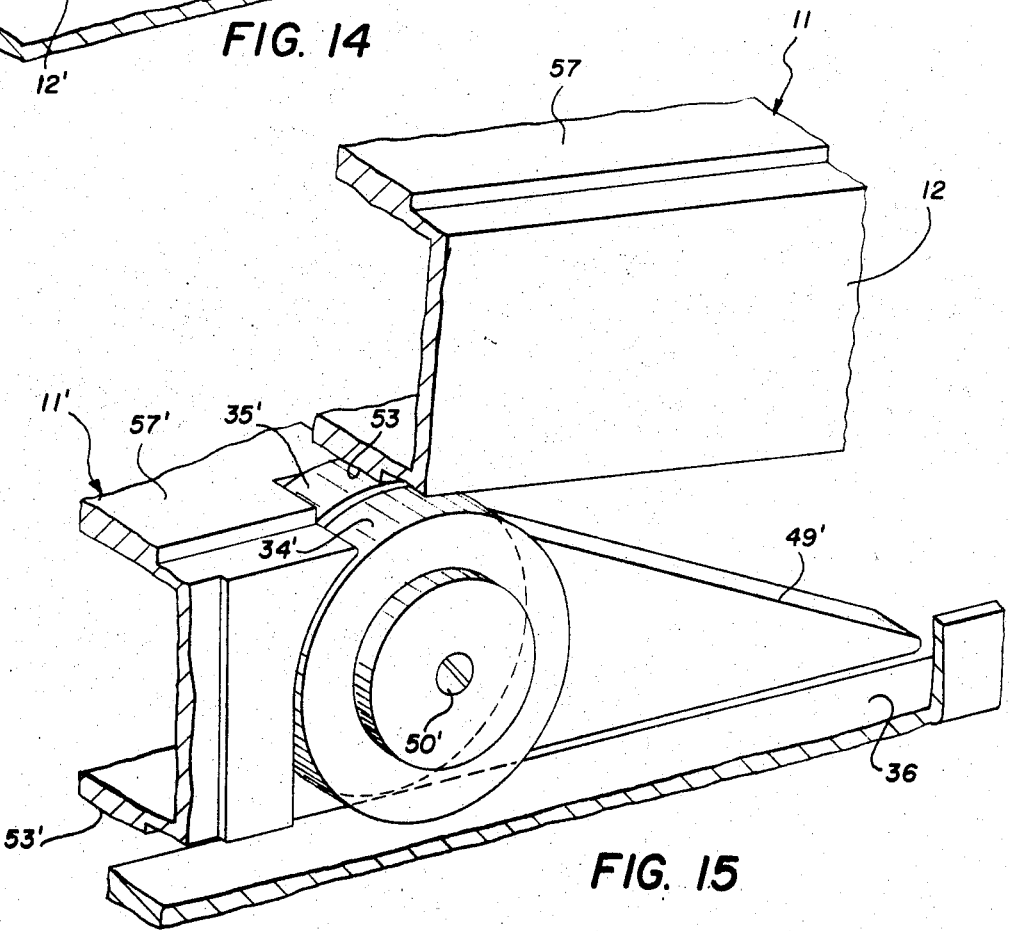
FIG. 15 is a perspective view of a detail of FIG. 9.

To interchange the respective positions of the first and second document holders 11 and 11' in the copying apparatus 1, the second document holder is pushed forward through the access way 10 and into the housing 2 so as to move the two ramp blocks 48' and 49' of that holder respectively against the two rearward inside rollers 31 and 29 of the first document holder (see FIGS. 1, 8, 13 and 14). As can be realized from FIGS. 8 and 14, such forward pushing of the second document holder 11' first serves to elevate the rearmost portion of the first document holder 11. This is so, because the two forward outside rollers 32 and 34 of the first document holder 11 are resting respectively against the two stop blocks 39 and 38, permitting the two ramp blocks 48' and 49' of the second document holder 11' to wedge respectively beneath the two rearward inside rollers 31 and 29 of the first document holder (see FIGS. 8, 13 and 14). Continued forward pushing of the second document holder 11' moves the two forward inside rollers 35' and 33' of that holder below, and in contact with, two parallel spaced rails 53 and 54 on the first document holder 11. These rails 53 and 54 extend along the underside of the first document holder 11, respectively between the two forward and rearward inside rollers 35 and 29 and the two forward and rearward inside rollers 33 and 31 of that holder (see FIGS. 9, 13 and 15). Thus, as shown in FIG. 9, the rearward portion of the first document holder 11 is further elevated.

It is to be recognized that as the second document holder 11' is pushed forward, the two forward outside rollers 32' and 34' of that holder are rolled on top of, and along, the two guide tracks 37 and 36 of the copying apparatus 1 and the two forward inside rollers 33' and 35' of the same holder are rolled beneath, and along, the two rails 54 and 53 on the underside of the first document holder 11 (see FIGS. 9, 10, 15 and 16). Accordingly, at this time, the two forward outside rollers 32' and 34' of the second document holder 11' and the two forward inside rollers 33' and 35' of that holder rotate in opposite directions. Such is possible, because the two forward outside rollers 32' and 34' are not in contact with the first document holder 11 and the two forward inside rollers 33' and 35' are not in contact with the two guide tracks 37 and 36 (again, see FIGS. 15 and 16).

Figure 16:
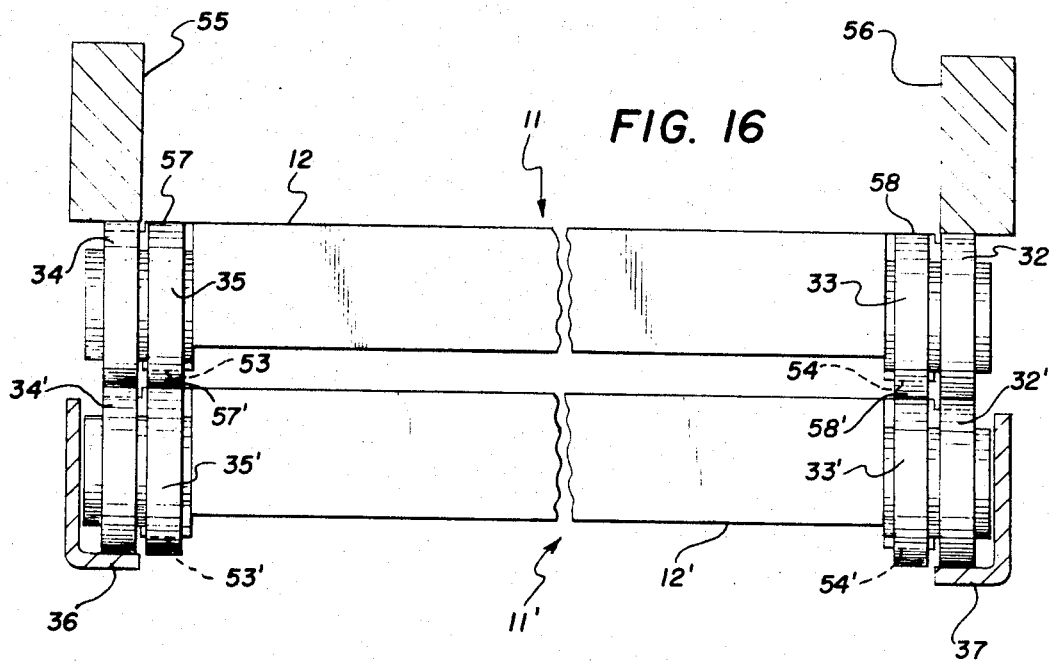
FIG. 16 is a section view as viewed along the line 16—16 in FIG. 10.
Figure 8:
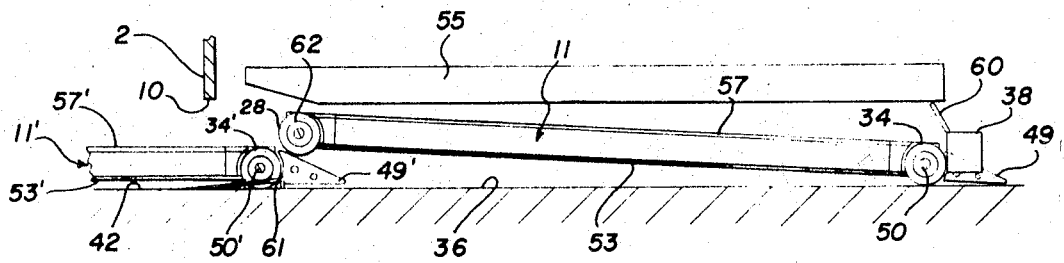
FIGS. 8–12 are partial elevation views of two document holders, sequentially showing the interchanging of such holders in the photographic copying apparatus.
Figure 9:
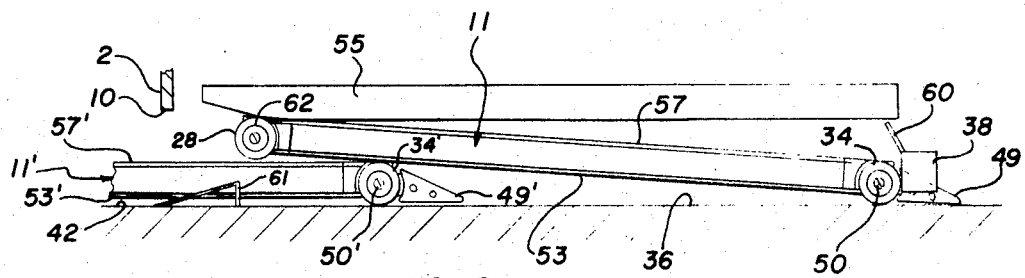

As can be realized from FIGS. 8 and 9 continued forward pushing of the second document holder 11' elevates the rearmost portion of the first document holder 11 in a manner raising the two rearward outside rollers 28 and 30 of the first document holder respectively into abutment with two parallel spaced guide bars 55 and 56 of the copying apparatus 1. These two guide bars 55 and 56, as shown in FIG. 16, extend parallel to the two guide tracks 36 and 37. Thereafter, in response to more forward pushing of the second document holder 11', the two forward inside rollers 33' and 35' of that holder (moving along the two rails 54 and 53 on the underside of the first document holder 11) will further elevate the first document holder so as to cause both of the document holders to assume the relative arrangement shown in FIGS. 10 and 16. At this time, as can be realized from FIGS. 10 and 16, the four outside rollers 28, 34 and 30, 32 of the first document holder 11 are positioned respectively in contact with the two guide bars 55 and 56 of the copying apparatus 1. Whereas, the four inside rollers 29, 35 and 31, 33 of the first document holder 11 are positioned respectively in contact with two parallel spaced rails 57' and 58', on the second document holder 11'. These rails 57' and 58' extend along the top side of the second document holder 11', respectively between the two forward and rearward inside rollers 35' and 29' and the two forward and rearward inside rollers 33' and 31' of that holder (see FIG. 13). Moreover, the rails 57' and 58' extend respectively parallel to the rails 53' and 54' on the underside of the second document holder 11' (see FIG. 13). Again viewing FIG. 16, the four outside rollers 28', 34' and 30', 32' of the second document holder 11' are positioned respectively in contact with the two guide tracks 36 and 37 of the copying apparatus 1 and the four inside rollers 29', 35' and 31', 33' of the second document holder are positioned respectively in contact with the two rails 53 and 54 on the underside of the first document holder 11.

Figure 10:
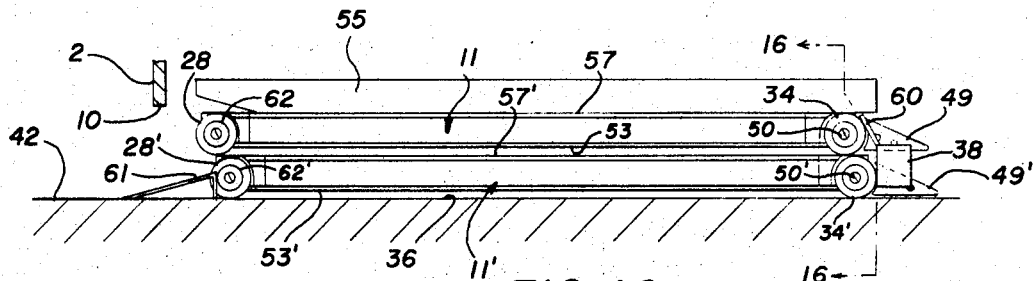

When the first and second document holders 11 and 11' are moved into the relative arrangement shown in FIG. 10, the two forward outside rollers 32 and 34 of the first document holder will come to rest against two inclined stop fingers 59 and 60, respectively fixed to the two stop blocks 39 and 38 (see FIG. 2), so as to slightly displace the first document holder, from the housing 2, into the access way 10. This permits the first document holder 11 to be grasped by an operator and withdrawn from the housing 2 as illustrated in FIGS. 11 and 12. As can be seen in FIG. 10, a depressible spring latch 61 snaps upward behind a rim 62' on the rearward outside wheel 28' of the second document holder 11', in response to forward movement of that holder into the document copying position within the housing 2. This latch 61 serves to retain the second document holder 11' in the housing 2, while the first document holder 11 is withdrawn through the access way 10. Just before the first document holder 11 is fully withdrawn from the housing 2, the two ramp blocks 48 and 49 of that holder are lowered respectively against the two rearward inside rollers 31' and 29' of the second document holder 11'(see FIGS. 11 and 12). Because these ramp blocks 48 and 49 are pivotally mounted on the first document holder 11, that holder is lowered onto the table 42 of the copying apparatus 1 in the manner schematically illustrated in FIG. 12

It will be appreciated that normally open switches (not shown) can be appropriately located inside the housing 2 or on the table 42 of the copying apparatus 1, which are closed in response to certain movement of the first and second document holders 11 and 11', in order to complete an electrical circuit (not shown) and initiate the operation of document copying when one of such holders is in the document copying position and the remaining one of such holders is in the document loading and unloading position.

Referring now to FIG. 17, the masking mechanism 9 is shown in detail. As stated hereinbefore, the masking mechanism 9 is arranged, within the housing 2 of the copying apparatus 1, between the light source 3 and whichever one of the first and second document holders 11 and 11' is in the document copying position (see FIG. 1). The function of the masking mechanism 9, in this instance, is to regulate the quantity of light, emitted from the light source 3 and reflected in the lens 6. FIG. 17 depicts the masking mechanism 9 when the first document holder 11 has been moved, in the direction generally indicated by an arrow 63, into the document copying position within the housing 2 and the second document holder 11' is in the document loading and unloading position on the table 42. As viewed in FIG. 17, the masking mechanism 9 includes forward and rearward masks 64 and 65 and right-hand and left-hand masks 66 and 67. These four masks 64, 65, 66 and 67 are thin opaque sheets, fixed respectively to forward, rearward, right-hand and left-hand mask holders or bars 68, 69, 70 and 71. The forward and rearward mask holders 68 and 69 support the forward and rearward masks 64 and 65, spaced apart, in the same plane. Whereas, the right-hand and left-hand mask holders 70 and 71 support the right-hand and left-hand masks 66 and 67, spaced apart, in another plane. As can be realized from FIG. 17, the plane which is occupied by the forward and rearward masks 64 and 65 and the plane which is occupied by the right and left-hand masks 66 and 67, extend in parallel spaced relation, the one slightly below the other.

As shown in FIG. 17, the forward and rearward mask holders 68 and 69 are fixed respectively to forward and rearward mask carriages 72 and 73. First and second channel defining members 74 and 75 extend, in parallel spaced relation, in the same direction as that generally indicated by the arrow 63. Two rods 76 and 77 and two other rods, designated by the same reference numbers 76 and 77, and mounted lengthwise respectively on the first and second channel defining members 74 and 75 (see FIGS. 17 and 18). Two peripherally grooved idler rollers 78 and 79 and two other peripherally grooved idler rollers, designated by the same reference numbers 78 and 79, depend respectively from the forward and rearward mask carriages 72 and 73 (again, see FIGS. 17 and 18). The rollers 78 and 79 of the forward mask carriage 72 are received between the rods 76 and 77 of the first channel defining member 74, for rolling movement of the forward mask carriage in opposite directions along the first channel defining member. Moreover, the rollers 78 and 79 of the rearward mask carriage 73 are received between the rods 76 and 77 of the second channel defining member 75, for rolling movement of the rear mask carriage in opposite directions along the second channel defining member. In this way, the forward and rearward masks 64 and 65 are separately supported for movement in the same direction as that generally indicated by the arrow 63 and for movement in an opposite direction.

Figure 18:
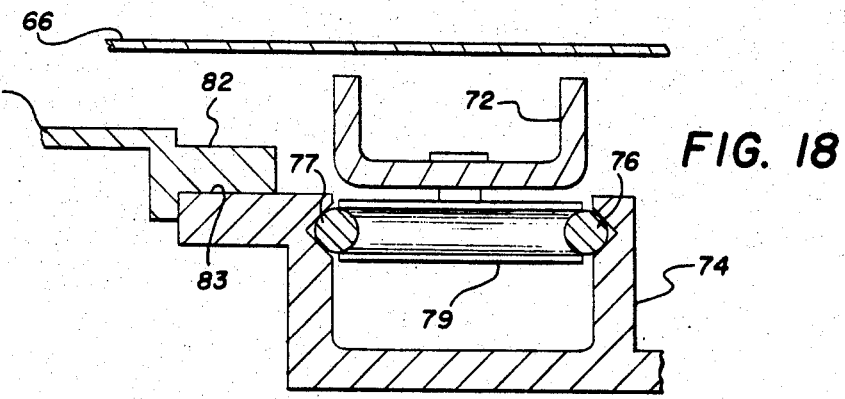
FIG. 18 is a section view as viewed along the line 18—18 in FIG. 17.

To facilitate rolling movement of the forward and rearward mask carriages 72 and 73 respectively along the first and second channel defining members 74 and 75, the forward mask holder 68 has a shoulder end portion 80 which rides along a rail 81, on the first channel defining member (see FIG. 17) and the rearward mask holder 69 has a shoulder end portion 82 which rides along a rail 83, on the second channel defining member (see FIGS. 17 and 18). Two U-shaped brackets 84 and 85 are fixed respectively to the forward and rearward mask carriages 72 and 73 and, as shown in FIG. 17, have abutment or flange members 86 and 87 which are disposed in aligned relation. Accordingly, if the abutment members 86 and 87 are pushed in the same direction as that generally indicated by the arrow 63, the forward and rearward masks 64 and 65 will be similarly moved. To return the forward and rearward masks 64 and 65 to an original or starting position, two helical compression springs 88 and 89 are disposed to urge these masks in a direction opposite to that generally indicated by the arrow 63. As shown in FIG. 17, two end blocks 90 and 91, located respectively in the first and second channel defining members 74 and 75, prevent the forward and rearward mask carriages 72 and 73 from being urged, by the springs 88 and 89, off these channel defining members.

Referring again to FIG. 17, the right and left-hand mask holders 70 and 71 are fixed respectively to right and left-hand mask carriages 92 and 93. As viewed in FIG. 17, a third channel defining member 94 is located above the first and second channel defining members 74 and 75. Moreover, the third channel defining member 94 extends in a direction which is 90° or 270° with respect to the direction generally indicated by the arrow 63. Two rods 95 and 96 are mounted lengthwise on the third channel defining member 94. Two peripherally grooved idler rollers 97 and 98 and two peripherally grooved idler rollers, designated by the same reference numbers 97 and 98, depend respectively from the right and left-hand carriages 92 and 93. These rollers 97 and 98 of the right and left-hand carriages 92 and 93 are received between the rods 95 and 96 of the third channel defining member 94, for rolling movement of the right and left-hand carriages toward and away from each other along the third channel defining member. In this way, the right and left-hand masks 66 and 67 are separately supported for movement in opposite directions which are 90° or 270° with respect to the opposite directions of movement of the forward and rearward masks 64 and 65.

As shown in FIG. 17, two abutment or arm members 99 and 100 converge in the direction generally indicated by the arrow 63 and have opposite ends the first of which, respectively, are pivotally connected by two coupling pins 101 and 102 to the right and left-hand carriages 92 and 93 and the second of which, respectively, are pivotally connected by two coupling pins 103 and 104 to two fixtures 105 and 106. As can be seen in FIG. 17, the coupling pins 103 and 104 extend respectively through slots 107 and 108 in the abutment members 99 and 100 and the fixtures 105 and 106 are secured respectively to the first and second channel defining members 74 and 75. Accordingly, as the abutment members 99 and 100 are pushed apart. swinging about the coupling pins 103 and 104, the right and left-hand masks 66 and 67 will be moved away from each other in opposite directions. As shown in FIG. 17, two end blocks 109 and 110 are located in the third channel defining member 94 to prevent the right and left-hand carriages 91 and 92 from being moved off this channel defining member. To return the right and left-hand masks 66 and 67 to an original or starting position, two helical compression springs 111 and 112 are disposed to urge these masks toward each other.

The forward, rearward, right-hand and left-hand masks 64–67 are movable, in the manner just described, to mask about the area framed by the easel members 15–18 and 15'–18' of whichever one of the document holders 11 and 11' is in the document copying position. In masking about this framed area, the four masks 64–67 cooperate to define an aperture therebetween which is substantially the size of the framed area and which has a center point 113, located on the principal axis of image projection 40 (see FIG. 17). Of course, the size of this defined aperture is varied as the masks 64–67 are moved. It will be realized, on viewing FIGS. 1 and 17, that such defined aperture serves to limit the quantity of light which is emitted from the light source 3 and reflected in the lens 6.

As shown in FIGS. 2 and 17, the four easel members 15, 16, 17 and 18 of the first document holder 11 have, depending respectively therefrom, four projecting members in the form of idler rollers 114, 115, 116 and 117. In particular, the rollers 116 and 117 are connected respectively to the easel members 18 and 16 by shafts 118 and 119 which extend through the slot 22 in the holder frame 12, and the rollers 114 and 115 are connected respectively to the easel members 17 and 15 by shafts 120 and 121 which extend through the slots 23 and 21 in the holder frame.

Because the rollers 114–117 are similar in construction and operation to those (not shown) on the easel members 15'–18' of the second document holder 11', only the manner of operation of the first-mentioned rollers (on the easel members 15–18 of the first document holder 11) will be described in detail. After movement of the easel members 15–18 to a selected area-framing position, followed by insertion of the first document holder 11 through the access way 10 and into the housing 2 (in the direction generally indicated by the arrow 63 in FIG. 17), the masks 64–67 will be moved to vary the size of the aperture defined thereby in relation to the size of the area framed by such easel members. That is to say, the masks 64–67 will be moved to an aperture-defining (or masking) position which corresponds to the area-framing position of the easel members 15–18. This is so, because the abutment members 86, 87, 99 and 100 extend respectively across the individual paths taken by the rollers 114, 115, 116 and 117 as the document holder 11 is inserted into the housing 2. Thus, the rollers 114 and 115 will push the abutment members 86 and 87 in the same direction as that generally indicated by the arrow 63 so as to similarly move the forward and rearward masks 64 and 65 to respective positions corresponding to the respective positions of the easel members 17 and 15. Moreover, the rollers 116 and 117 will push the abutment members 99 and 100 apart, swinging such members about the coupling pins 103 and 104, so as to move the right and left-hand masks 66 and 67 away from each other to respective positions corresponding to the respective positions of the easel members 18 and 16. When the first document holder 11 is fully inserted into the housing 2, to assume the document copying position, the rollers 116 and 117 come to rest respectively against T-shaped blocks 122 and 123. As shown in FIG. 17, these blocks 122 and 123 are fixed to the right and left-hand mask carriages 92 and 93.

To remove the first document holder 11 from the housing 2, the second document holder 11' is inserted into the housing (see FIGS. 8–12). As previously stated, insertion of the second document holder 11' into the housing 2 causes the first document holder 11 to be raised off the guide tracks 36 and 37 in the manner shown in FIGS. 8–10. Accordingly, the rollers 114, 115, 116 and 117 will be moved respectively out of contact with the abutment members 86, 87, 99 and 100, permitting the springs 88, 89, 111 and 112 to return the masks 64–67 to an original or starting position.

The present invention has been described in detail with particular reference to a preferred embodiment thereof; it will be understood, however, that variations and modifications can be effected within the spirit and scope of the invention.

We claim:

1. In a photographic copying apparatus, the combination comprising:

a document holder for carrying different size documents;

means for supporting said document holder, on the photographic copying apparatus, for movement between a document copying position and a document loading and unloading position;

an easel mechanism mounted on said document holder and including a plurality of easel members which cooperate to frame an area occupied by a document and at least one of which is movable to vary the size of such area for accommodating different size documents;

first and second cooperating means respectively mounted on said document holder and said supporting means for restraining at least one of said easel members from movement to vary the size of the area framed by said easel members, in response to movement of said document holder out of the document loading and unloading position, and for releasing at least one of said easel members for movement to vary the size of such area, in response to movement of said document holder into the document loading and unloading position.

2. The combination as recited in claim 1 wherein said first and second cooperating means include:
easel member restraining means including a restraining member and means mounting said restraining member for movement between a locking position, in which at least one of said easel members is restrained from movement to vary the size of the area framed by said easel members and an idle position, in which at least one of said easel members is released for movement to vary the size of such area;
means for urging said restraining member into the locking position; and
means for moving said restraining member into the idle position as said document holder is moved into the document loading and unloading position.

3. The combination as recited in claim 1 wherein said first and second cooperating means include:
a resiliently flexible reed member having opposite ends fixed to a respective one of said easel members which is movable to vary the size of the area framed by said easel members;
a channel defining member fixed to said document holder and defining a channel in which said reed member is disposed for movement with said one easel member;
a clamp member;
means mounting said clamp member, on said channel defining member, for pivotal movement into abutment against said reed member, between said opposite ends thereof;
spring means for urging said clamp member into abutment against said reed member in a manner flexing said reed member firmly into contact with said channel defining member; and
cam means fixed to said document holder supporting means for pivotally moving said clamp member out of abutment against said reed member as said document holder is moved into the document loading and unloading position.

* * * * *